US012579652B1

(12) United States Patent
Wang et al.

(10) Patent No.: US 12,579,652 B1
(45) Date of Patent: Mar. 17, 2026

(54) SAFE AND ROBUST ROBOTIC PICKING OF ITEMS BASED ON REFERENCE IMAGE AND ITEM ATTRIBUTES

(71) Applicant: Amazon Technologies, Inc., Seattle, WA (US)

(72) Inventors: Fan Wang, Woburn, MA (US); Jane Shi, Tewksbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 1105 days.

(21) Appl. No.: 17/527,899

(22) Filed: Nov. 16, 2021

(51) Int. Cl.
| | |
|---|---|
| *G06T 7/00* | (2017.01) |
| *B25J 9/16* | (2006.01) |
| *B25J 15/00* | (2006.01) |
| *B65G 1/137* | (2006.01) |
| *G06F 18/21* | (2023.01) |
| *G06N 3/045* | (2023.01) |
| *G06T 7/11* | (2017.01) |
| *G06V 10/75* | (2022.01) |
| *B25J 15/06* | (2006.01) |

(52) U.S. Cl.
CPC .............. *G06T 7/11* (2017.01); *B25J 9/1612* (2013.01); *B25J 9/163* (2013.01); *B25J 15/0052* (2013.01); *B65G 1/1371* (2013.01); *B65G 1/1378* (2013.01); *G06F 18/21* (2023.01); *G06N 3/045* (2023.01); *G06V 10/751* (2022.01); *B25J 15/0616* (2013.01); *G06T 2207/20084* (2013.01)

(58) Field of Classification Search
CPC .............. G06T 7/11; G06T 2207/20084; B25J 9/1612; B25J 9/163; B25J 15/0052; B25J 15/0616; B65G 1/1371; B65G 1/1378; G06F 18/21; G06N 3/045; G06V 10/751
See application file for complete search history.

(56) References Cited

U.S. PATENT DOCUMENTS

| | | | |
|---|---|---|---|
| 2018/0285386 A1* | 10/2018 | Liu | G06V 30/413 |
| 2020/0311956 A1* | 10/2020 | Choi | G06V 10/454 |
| 2022/0410381 A1* | 12/2022 | Stoppi | G06T 7/50 |

OTHER PUBLICATIONS

Michaelis et al, One-Shot Instance Segmentation, arXiv:1811. 11507v2 May 28 (Year: 2019).*
Janocha et al, On Loss Functions for Deep Neural Networks in Classification, arXiv:1702.05659v1 Feb. 18 (Year: 2017).*

(Continued)

*Primary Examiner* — Xiao Liu
(74) *Attorney, Agent, or Firm* — Eversheds Sutherland (US) LLP

(57) ABSTRACT

Systems and techniques for performing robotic picking of items based on a reference image and item attributes are described. In an example technique, an image of a picking environment having multiple items is obtained. A reference image of a first item is obtained, based on an item ID associated with the first item. An instance segmentation operation is performed on the image of the picking environment to determine an instance of the first item within the image of the picking environment, based on the reference image and the image of the picking environment. A grasp plan for a robotic arm end-of-arm tool is generated based on segmentation information output from the instance segmentation operation and the item attributes. The end-of-arm tool is controlled to pick an item from the multiple items according to the grasp plan.

14 Claims, 14 Drawing Sheets

(56) References Cited

OTHER PUBLICATIONS

Tong et al, Hierarchical disentanglement of discriminative latent features for zero-shot learning, CVPR (Year: 2019).*

Jiwoon Ahn, Sunghyun Cho, and Suha Kwak. Weakly supervised learning of instance segmentation with inter-pixel relations, 2019.

Daniel Bolya, Chong Zhou, Fanyi Xiao, and Yong Jae Lee. YOLACT: real-time instance segmentation. CoRR, abs/1904.02689, 2019.

Y. Boykov and V. Kolmogorov. An experimental comparison of min-cut/max- flow algorithms for energy minimization in vision. IEEE Transactions on Pattern Analysis and Machine Intelligence, 26:1124-1137, 2004.

Alan S. Brown. Amazon's robot arms break ground in safety, technology. https://www.amazon.science/ latest-news/ amazon-robotics-see-robinrobot-arms-in-action. Accessed: Aug. 22, 2022.

S. Caelles, K. K. Maninis, J. Pont-Tuset, L. Leal-Taix'e, D. Cremers, and L. V. Gool. One-shot video object segmentation. In 2017 IEEE Conference on Computer Vision and Pattern Recognition (CVPR), pp. 5320-5329, 2017.

Jifeng Dai, Kaiming He, and Jian Sun. Instance-aware semantic segmentation via multi-task network cascades. CoRR, abs/1512.04412, 2015.

Michael Danielczuk, Matthew Matl, Saurabh Gupta, Andrew Li, Andrew Lee, Jeffrey Mahler, and Ken Goldberg. Segmenting unknown 3d objects from real depth images using mask R-CNN trained on synthetic point clouds. CoRR, abs/1809.05825, 2018.

Bert De Brabandere, Davy Neven, and Luc Van Gool. Semantic instance segmentation for autonomous driving. In 2017 IEEE Conference on Computer Vision and Pattern Recognition Workshops (CVPRW), pp. 478-480, 2017.

Matteo Dunnhofer, Maria Antico, Fumio Sasazawa, Yu Takeda, Saskia Camps, Niki Martinel, Christian Micheloni, Gustavo Cameiro, and Davide Fontanarosa. Siam-u-net: encoder-decoder siamese network for knee cartilage tracking in ultrasound images. Medical Image Analysis, 60:101631, 2020.

Vandit Gajar, Ayesha Gumnani, and Yash Khandhediya. Human detection and tracking for video surveillance a cognitive science approach, 2017.

Kaiming He, Georgia Gkioxari, Piotr Dollar, and Ross B. Girshick. Mask R-CNN. CoRR, abs/1703.06870, 2017.

Kaiming He, Xiangyu Zhang, Shaoqing Ren, and Jian Sun. Deep residual learning for image recognition. CoRR, abs/1512.03385, 2015.

Cheng-Chun Hsu, Kuang-Jui Hsu, Chung-Chi Tsai, Yen-Yu Lin, and Yung-Yu Chuang. Weakly supervised instance segmentation using the bounding box tightness prior. In H.Wallach, H. Larochelle, A. Beygelzimer, F. d'Alché-Buc, E. Fox, and R. Gamett, editors, Advances in Neural Information Processing Systems, vol. 32. Curran Associates, Inc., 2019.

Guoheng Huang, Chi-Man Pun, and Cong Lin. Unsupervised video co-segmentation based on superpixel co-saliency and region merging. Multimedia Tools Appl., 76(10):12941-12964, May 2017. [Abstract Only].

Lei Ke, Yu-Wing Tai, and Chi-Keung Tang. Deep occlusionaware instance segmentation with overlapping bilayers. CoRR, abs/2103.12340, 2021.

M. Khodabandeh, S. Muralidharan, A. Vahdat, N. Mehrasa, E. M. Pereira, S. Satoh, and G. Mori. Unsupervised learning of supervoxel embeddings for video segmentation. In 2016 23rd International Conference on Pattern Recognition (ICPR), pp. 2392-2397, 2016.

Wonjik Kim, Asako Kanezaki, and Masayuki Tanaka. Unsupervised learning of image segmentation based on differentiable feature clustering. CoRR, abs/2007.09990, 2020.

Gregory R. Koch. Siamese neural networks for one-shot image recognition. 2015.

H. Liao, T. Inomata, I. Sakuma, and T. Dohi. 3-d augmented reality for mri-guided surgery using integral videography autostereoscopic image overlay. IEEE Transactions on Biomedical Engineering, 57(6):1476-1486, 2010.

Di Lin, Jifeng Dai, Jiaya Jia, Kaiming He, and Jian Sun. Scribblesup: Scribble-supervised convolutional networks for semantic segmentation, 2016.

Tsung-Yi Lin, Piotr Doll'ar, Ross B. Girshick, Kaiming He, Bharath Hariharan, and Serge J. Belongie. Feature pyramid networks for object detection. CoRR, abs/1612.03144, 2016.

Tsung-Yi Lin, Michael Maire, Serge J. Belongie, Lubomir D. Bourdev, Ross B. Girshick, James Hays, Pietro Perona, Deva Ramanan, Piotr Dollár, and C. Lawrence Zitnick. Microsoft COCO: common objects in context. CoRR, abs/1405.0312, 2014.

Claudio Michaelis, Matthias Bethge, and Alexander S. Ecker. Closing the generalization gap in one-shot object detection. CoRR, abs/2011.04267, 2020.

Claudio Michaelis, Ivan Ustyuzhaninov, Matthias Bethge, and Alexander S. Ecker. One-shot instance segmentation, 2019.

Catherine Douglas Moran. Online grocery will leap to $ 250b in 5 years, report says. https://www.grocerydive.com/news/online-grocery-2025-projection-jumps/585493/.

Deepak Pathak, Evan Shelhamer, Jonathan Long, and Trevor Darrell. Fully convolutional multi-class multiple instance learning, 2015.

F. Perazzi, A. Khoreva, R. Benenson, B. Schiele, and A. Sorkine-Hornung. Learning video object segmentation from static images. In 2017 IEEE Conference on Computer Vision and Pattern Recognition (CVPR), pp. 3491-3500, 2017.

Pedro H. O. Pinheiro and Ronan Collobert. Weakly supervised semantic segmentation with convolutional networks. CORR, abs/1411.6228, 2014.

Powerreviews. The evolution of the modern grocery shopper. https://www.powerreviews.com/insights/moderngrocery-shopper/.

H. Ramadan and H. Tairi. Automatic human segmentation in video using convex active contours. In 2016 13th International Conference on Computer Graphics, Imaging and Visualization (CGIV), pp. 184-189, 2016. [Abstract Only].

Mengye Ren and Richard S. Zemel. End-to-end instance segmentation and counting with recurrent attention. CoRR, abs/1605.09410, 2016.

Shaoqing Ren, Kaiming He, Ross B. Girshick, and Jian Sun. Faster R-CNN: towards real-time object detection with region proposal networks. CoRR, abs/1506.01497, 2015.

Bernardino Romera-Paredes and Philip H. S. Torr. Recurrent instance segmentation. CoRR, abs/1511.08250, 2015.

Olaf Ronneberger, Philipp Fischer, and Thomas Brox. U-net: Convolutional networks for biomedical image segmentation. CoRR, abs/1505.04597, 2015.

Carsten Rother, Vladimir Kolmogorov, and Andrew Blake. "grabcut": Interactive foreground extraction using iterated graph cuts. ACM Trans. Graph., 23(3):309-314, Aug. 2004.

Niels Ole Salscheider. Object tracking by detection with visual and motion cues. CoRR, abs/2101.07549, 2021.

Jo Schlemper, Ozan Oktay, Michiel Schaap, Mattias P. Heinrich, Bernhard Kainz, Ben Glocker, and Daniel Rueckert. Attention gated networks: Learning to leverage salient regions in medical images. CoRR, abs/1808.08114, 2018.

Amit Agawal Siddhartha Chandra, Ambrish Tyagi. Box2seg: Attention weighted loss and discriminative feature learning for weakly supervised segmentationt. In 2020 Amazon Computer Vision Conference, 2020.

Ashish Sinha and Jose Dolz. Multi-scale guided attention for medical image segmentation. CoRR, abs/1906.02849, 2019.

Rudolph Triebel, Jiwon Shin, and Roland Siegwart. Segmentation and unsupervised part-based discovery of repetitive objects. Jun. 2010.

Jordan Valinsky. "Amazon makes grocery delivery free for Prime Members," Dated Oct. 29, 2019, https:lite.cnn.com/en/article/h_dad40ffe4b7919db29141acf3fb72e71.

Paul Voigtlaender and Bastian Leibe. Online adaptation of convolutional neural networks for video object segmentation. In BMVC, 2017.

Fan Wang, Qixing Huang, Maks Ovsjanikov, and Leonidas J. Guibas. Unsupervised multi-class joint image segmentation. In 2014 IEEE Conference on Computer Vision and Pattern Recognition, pp. 3142-3149, 2014.

(56) References Cited

OTHER PUBLICATIONS

Christopher Xie, Yu Xiang, Arsalan Mousavian, and Dieter Fox. Unseen object instance segmentation for robotic environments. CoRR, abs/2007.08073, 2020.

Ziyu Zhang, Sanja Fidler, and Raquel Urtasun. Instancelevel segmentation for autonomous driving with deep densely connected mrfs, 2016.

Yanzhao Zhou, Yi Zhu, Qixiang Ye, Qiang Qiu, and Jianbin Jiao. Weakly supervised instance segmentation using class peak response. CoRR, abs/1804.00880, 2018.

* cited by examiner

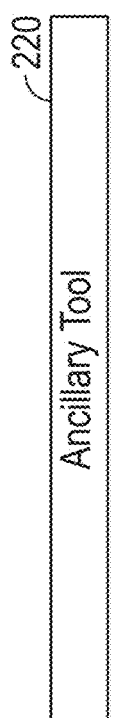
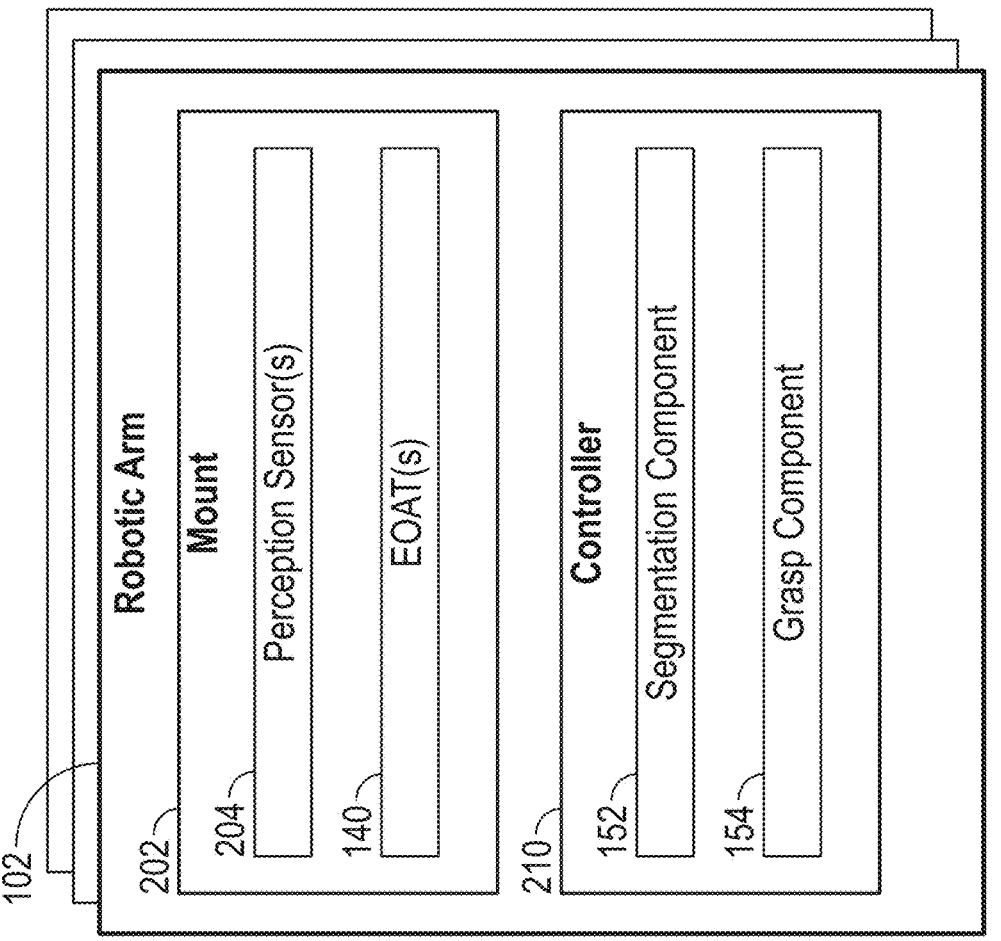
FIG. 2

310

320

410

420-1

420-2

420-3

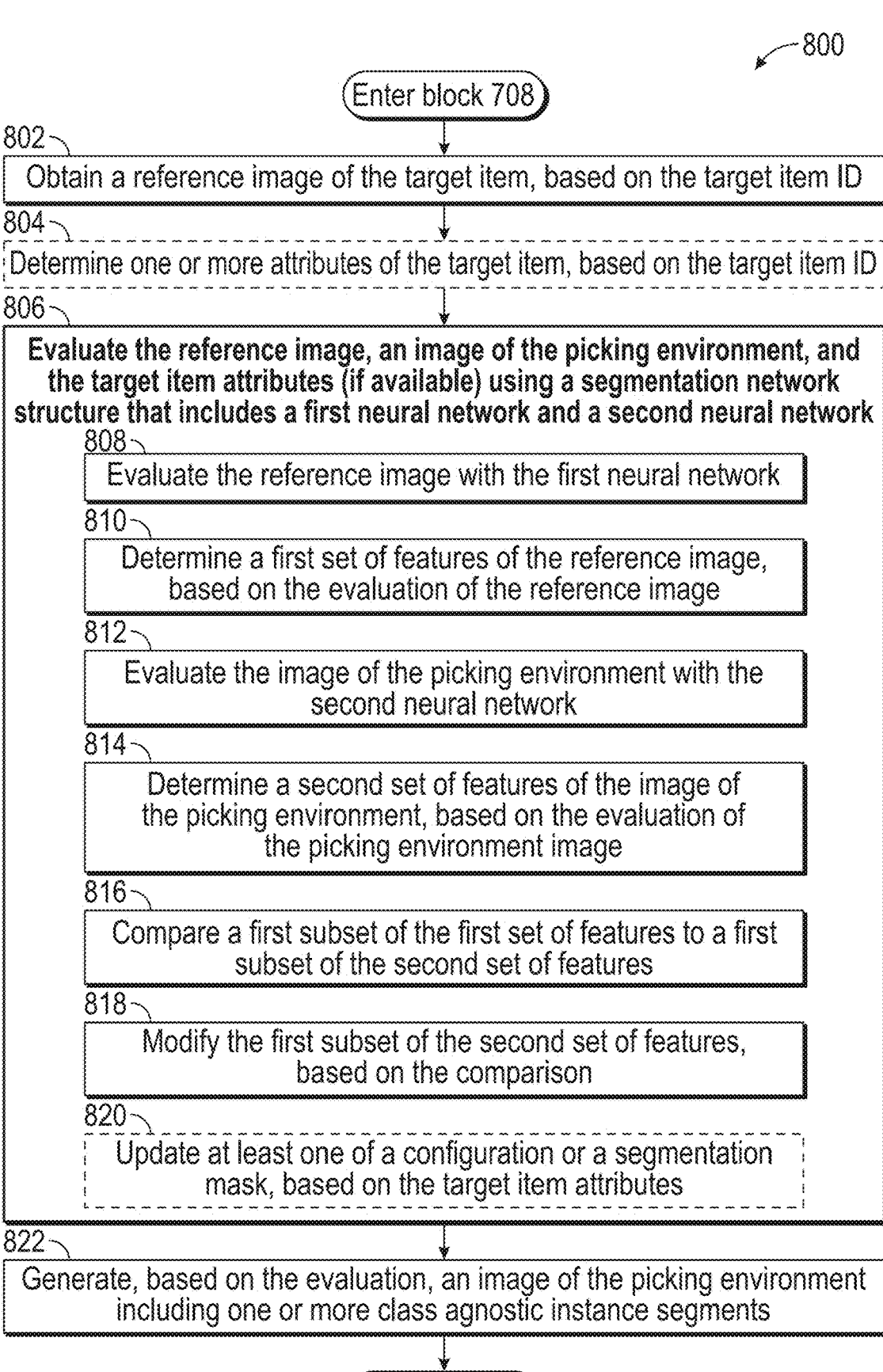

─800

Enter block 708

802 ─
Obtain a reference image of the target item, based on the target item ID

804 ─
Determine one or more attributes of the target item, based on the target item ID 806 ─
Evaluate the reference image, an image of the picking environment, and the target item attributes (if available) using a segmentation network structure that includes a first neural network and a second neural network

808 ─
Evaluate the reference image with the first neural network

810 ─
Determine a first set of features of the reference image, based on the evaluation of the reference image 812 ─
Evaluate the image of the picking environment with the second neural network 814 ─
Determine a second set of features of the image of the picking environment, based on the evaluation of the picking environment image 816 ─
Compare a first subset of the first set of features to a first subset of the second set of features 818 ─
Modify the first subset of the second set of features, based on the comparison 820 ─
Update at least one of a configuration or a segmentation mask, based on the target item attributes 822 ─
Generate, based on the evaluation, an image of the picking environment including one or more class agnostic instance segments Exit block 708

FIG. 8

SAFE AND ROBUST ROBOTIC PICKING OF ITEMS BASED ON REFERENCE IMAGE AND ITEM ATTRIBUTES

BACKGROUND

The present disclosure generally relates to robotic purchase order fulfillment (e.g., grocery order fulfillment), and more specifically to robotic picking of items (e.g., grocery items) leveraging item attributes and a reference image of the item.

A facility (e.g., grocery store) may implement an automated order fulfillment operation to provide convenience for customers of the facility. For example, the facility can employ a robotic system to perform various tasks, including but not limited to, picking items, packing items, etc., in order to fulfill a customer's purchase order. The robotic system can pick items directly from inbound bulk containers (or totes) and pack the items into the customer's shipping bags (or packages).

The robotic system may perform instance segmentation as part of an automated picking operation in order to identify and select an item from the bulk container. Instance segmentation generally involves detecting and delineating each distinct object of interest appearing in an image. The success of the automated order fulfillment operation may depend on the accuracy of the instance segmentation. For example, an inaccurate segmentation can lead to picking defects and item damage.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

FIG. 2 is a block diagram of a robotic arm, according to one embodiment.

FIG. 8 is a flowchart of a method for performing instance segmentation, according to one embodiment.

DETAILED DESCRIPTION

Figure 1:
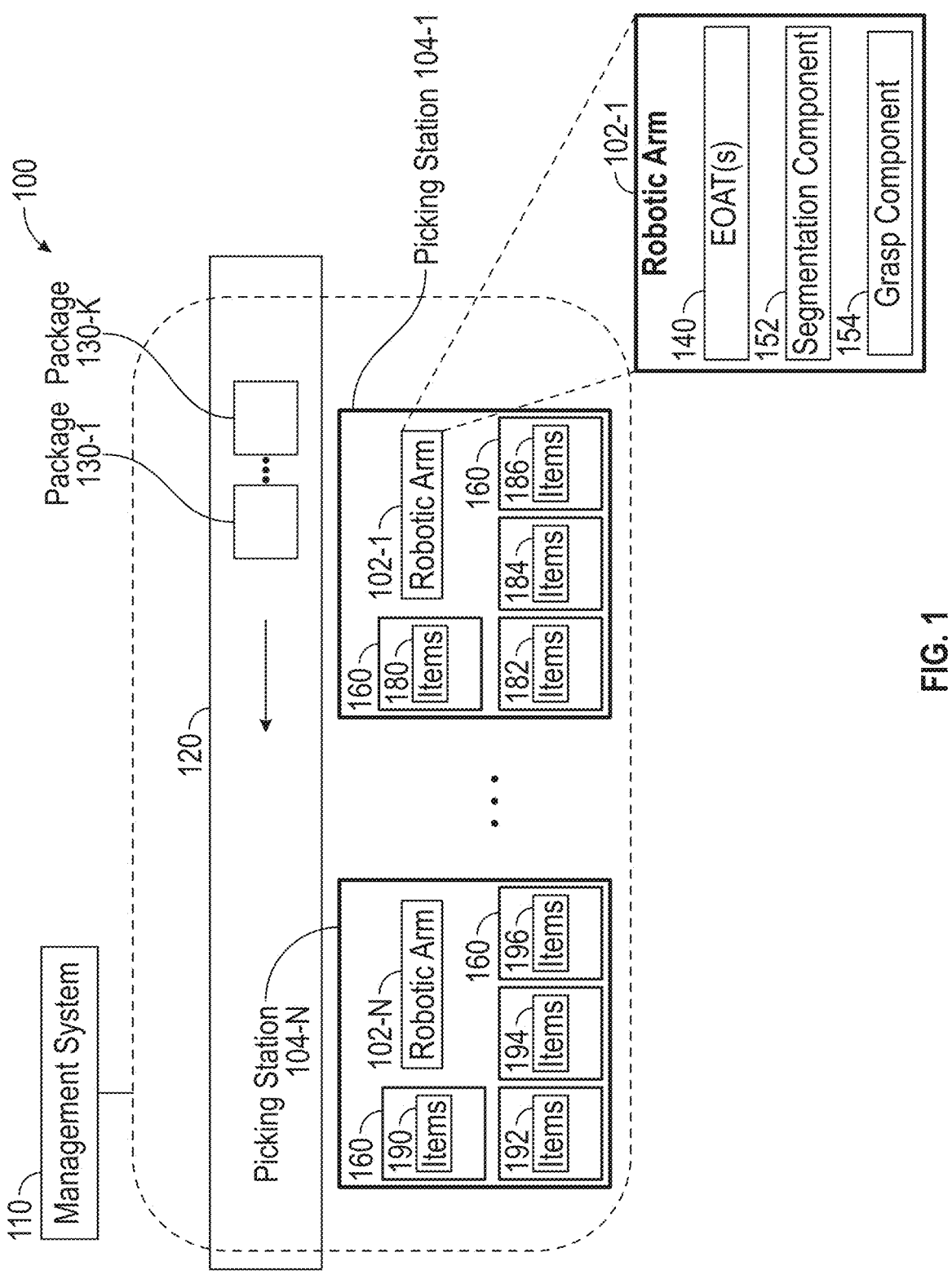
FIG. 1 is a block diagram of an automated order fulfillment system, according to one embodiment.

A robotic (or automated) picking operation may involve picking an individual item from a bulk container of items. To pick the item, a robotic system may perform instance segmentation to identify and select the item from the bulk container of items. One issue with robotic picking operations is that can be challenging to accurately segment an instance of an item from a bulk container of items. For example, the bulk container of items may include a heavy clutter of items, a wide variety of items in shapes and appearances, ambiguous target definitions for items in a bundle, multiple items of the same identifier (ID) (e.g., the same type of items), multiple items of different IDs (e.g., different types of items), etc.

Instance segmentation generally aims to predict, for each pixel within an image, the instance mask and corresponding class label associated with the pixel. Conventional robotic picking operations generally use supervised instance segmentation approaches, which target object categories with task-specific data. Examples of supervised instance segmentation algorithms, include but are not limited to, Mask Region-Based Convolutional Neural Network (Mask R-CNN), Yolact, etc. In some cases, supervised instance segmentation algorithms can achieve high segmentation accuracy when a large number of training data is available. However, the accuracy of supervised approaches decreases on items outside their trained distributions. The low accuracy in segmenting novel objects can make applications of supervised instance segmentation (e.g., in robotic picking operations) difficult, as large-scale task specific data may not be available in many instances and generating this data can be very labor-intensive.

In many cases, an inaccurate segmentation can lead to picking defects and item damage. For instance, an under-segmentation can lead to the robotic system picking multiple items simultaneously from the bulk container, instead of an individual item from the bulk container. On the other hand, an over-segmentation can result in the robotic system choosing wrong (or improper) grasping points for grasping an item from the bulk container.

Accordingly, embodiments provide techniques for improving the accuracy of instance segmentation in order to allow for safe and robust robotic picking of items. More specifically, embodiments can perform instance segmentation leveraging item attributes and a reference image of the item. For example, in one embodiment described herein, a robotic system can capture an image of a picking scene that includes multiple items. The multiple items can include items of the same ID or different IDs. The robotic system can use the ID of a target item to determine attributes of the target item (e.g., size, dimensions, weight, item category, shape, fragility, etc.). Additionally, the robotic system can use the ID of the target item to obtain a reference image (e.g., two-dimensional (2D) image) of the target item.

As described below, embodiments can use a new segmentation network structure to segment all instances of the target item in the picking scene with the reference image of the target item. The segmentation network structure can generate features and semantic cues from both the reference image and the picking scene image and can fuse them selectively at different abstraction levels. The selective fusion of the features and semantic cues (from the different images) guides segmentation towards the referenced semantic category while making good use of the low level features (e.g., non-semantic features, such as edges, corners, etc.) of the picking scene. Additionally, in some embodiments, the segmentation network structure can use attributes of the target item (e.g., size and aspect ratio of the target item in pixel space) to further refine segmentation outputs. In this manner, embodiments can improve the specificity of the segmentation and reduce the amount of task-specific training data used for segmentation, relative to other supervised instance segmentation approaches, for example.

Additionally, as described below, the increase in segmentation accuracy can significantly boost the manipulation performance of the robotic system. For example, the robotic system may include a robotic arm with an end-of-arm tool (EOAT) that is configured to grasp an item from the bulk container and place the item in another location (e.g., shipping bag). The EOAT may be configured to use different types of grasps (e.g., vacuum, pinch, parallel grasping, etc.) and/or different grasping forces when picking an item. In some embodiments, the robotic system can use the item attributes (determined from the known ID of the target item) along with the segmentation output (from the segmentation network structure) to determine which type of grasp and/or amount of grasping force is suitable for picking the target item. For example, assuming the target item is a fragile item (e.g., fruit, bread, banana, etc.), the robotic system can select a type of grasp and/or use an amount of force that minimizes (or reduces) damage to the target item.

Note that certain embodiments are described herein using grocery items as an example of retail items that can be picked using an automated order fulfillment system (e.g., an automated grocery fulfillment system). In other embodiments, the techniques presented herein may be adapted for use by a broad variety of retailers (e.g., discount stores, department stores, etc.) for a variety of retail items (e.g., clothing, electronics, books, etc.). As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

FIG. 1 illustrates an example automated order fulfillment system 100, according to one embodiment. The automated order fulfillment system 100 may be located within a facility (e.g., grocery store, warehouse, fulfillment center, etc.). In one particular embodiment, the automated order fulfillment system 100 (also referred to as robotic order fulfillment system) is an automated grocery order fulfillment system (also referred to as a robotic grocery order fulfillment system).

Here, the automated order fulfillment system 100 includes picking stations 104 1-N, a holding area 120, and a management system 110. The holding area 120 generally represents an area (or section) of a facility in which items are moved (or transitioned or inducted) to other areas within the facility. The holding area 120 may have a variety of different configurations (e.g., shape, material, angle, height (or elevation), etc.) suitable for moving items within the facility. In one particular embodiment, the holding area 120 may include a conveyor (including a conveyor belt) that transitions packages 130 1-K (containing items) to other picking stations within the facility and/or other operational areas (e.g., staging, shipping, etc.) within the facility.

Each picking station 104 includes a robotic arm 102 and one or more holding areas 160. The holding area(s) 160 within each picking station 104 generally represents an area for holding items (e.g., grocery items). The holding area(s) 160 is representative of a variety of surfaces and can have any form factor suitable for holding items (e.g., table, floor, pallet, conveyor belt, container, tote, etc.). In one particular embodiment, each holding area 160 within a picking station 104 includes items (e.g., grocery items) of the same ID (e.g., items of the same type). For example, within picking station 104-1, a first holding area 160 includes multiple items 180 (e.g., bananas), a second holding area 160 includes multiple items 182 (e.g., oranges), a third holding area 160 includes multiple items 184 (e.g., pears), and a fourth holding area 160 includes multiple items 186 (e.g., apples). Similarly, within picking station 104-N, a first holding area 160 includes multiple items 190 (e.g., bread loaves), a second holding area 160 includes multiple items 192 (granola bars), a third holding area 160 includes multiple items 194 (black bean cans), and a fourth holding area 160 includes multiple items 196 (soup cans). Although not shown, in other embodiments, one or more holding areas 160 within a given picking station 104 can include items (e.g., grocery items) of different IDs (e.g., items of different types). As a reference example, a given holding area 160 may include items of a first ID (e.g., bananas), items of a second ID (e.g., oranges), and so on.

In some embodiments, the picking stations 104 may be arranged based on item categories (e.g., grocery item categories). For example, a first picking station 104 may include items of a first item category (e.g., fruits), a second picking station 104 may include items of a second item category (e.g., non-perishable items), a third picking station 104 may include items of a third item category (e.g., snack items), and so on. In some embodiments, the picking stations 104 may be arranged based on one or more item attributes (e.g., weight, size, frozen, etc.). For example, a first picking station 104 may include heavy items, a second picking station 104 may include lighter items, etc. In another example, a first picking station 104 may include perishable food items, a second picking station 104 may include non-perishable food items, etc.

Each picking station 104 is generally configured to perform automated picking of items from one or more holding areas 160 (within the picking station 104) in order to fulfill a customer's order (e.g., grocery order). For example, within a given picking station 104, the robotic arm 102 can pick item(s) from the holding area(s) 160 and place the item(s) into one or more packages 130 in the holding area 120. One or more of the packages 130 may hold items from the same grocery order. Once items from a given picking station 104 (e.g., picking station 104-1) have been placed into one or more of the packages 130, the packages 130 may transition via the holding area 120 (e.g., conveyor) to another picking station (e.g., picking station 104-2), so that additional items can be picked and placed into the package(s) 130 by the other picking station. The management system 110 can send commands (or instructions) to each of the picking stations 104 and the holding area 120 to coordinate and control the movement of the robotic arms 102 and the package(s) 130.

Each robotic arm 102 includes one or more EOATs 140, which the robotic arm 102 can use to pick an item from the holding area 160 and place the item into one of the packages 130. Each robotic arm 102 also includes a segmentation component 152 and a grasp component 154, which can include hardware components, software components, or combinations thereof. In one embodiment, the robotic arm 102 can use the segmentation component 152 to identify and segment individual items from multiple items (e.g., items 180) within a given holding area 160, which presents multiple items (e.g., items 180) of the same ID and/or multiple items of different IDs. In one embodiment, the robotic arm 102 can use the grasp component 154 to determine a grasp plan for picking a target item with the EOAT 140 safely and securely. For example, the grasp plan can include a type of grasp, one or more pick (or grasp) points on the target item, an amount of grasp force to use for the type of grasp, etc. The grasp component 154 can determine the grasp plan based on attributes of the target item, the segmentation output from the segmentation component 152, etc.

Note, the segmentation component 152 and the grasp component 154 are described in further detail below. Further note that while FIG. 1 depicts the robotic arm 102 with a segmentation component 152 and a grasp component 154, in some embodiments, the segmentation component 152 and the grasp component 154 may be located elsewhere. For example, in some embodiments, the segmentation component 152 and the grasp component 154 may be located within the management system 110.

FIG. 2 is a block diagram of a robotic arm 102, according to one embodiment. Although one robotic arm 102 is depicted, there may be any number of robotic arms 102 located within a picking station 104. The robotic arm 102 may support various components used for a robotic picking operation. Here, for example, the robotic arm 102 includes a mount 202, which supports one or more perception sensors 204 and an EOAT(s) 140, and a controller 210 (also referred to as a computing system). In embodiments with multiple robotic arms, the robotic arms can have same or different perception sensor(s) 204 and/or same or different EOATs 140.

The perception sensor(s) 204 may include a visual sensor (e.g., camera), depth sensor, infrared sensor, barcode reader, force sensing sensor, pressure sensor, gyroscope, accelerometer, or combinations thereof. The perception sensor 204 can be any sensor (or combination of sensors) that permits the automated order fulfillment system 100 to identify items in a holding area 160, identify packages 130 in a holding area 120, identify occupied versus empty space in a holding area(s) 160 and/or holding area 120, determine an orientation of the EOAT 140, determine an amount of force to applied to an item (via EOAT 140), and the like.

The perception sensors 204 can be disposed in different locations on the robotic arm 102. For example, while FIG. 2 illustrates coupling the perception sensors 204 to the mount 202, one or more of the perception sensors 204 can be mounted elsewhere. For example, a perception sensor 204 can be mounted to the EOAT 140 to allow the EOAT 140 to determine the amount of force applied to an item. In another embodiment, a perception sensor may be located on a structure external to the mount 202 (e.g., ancillary tool 220). Thus, a perception sensor 204 can be attached to the mount 202 or be external to mount 202 and the robotic arm 102.

Figure 3:
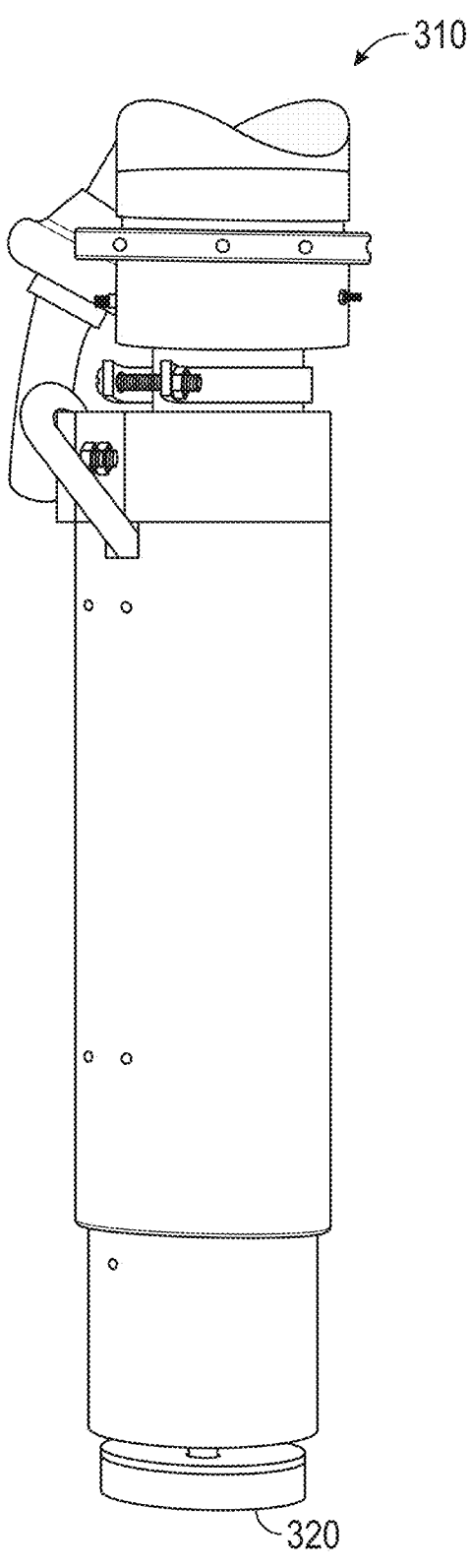
FIG. 3 illustrates an example end effector for an end-of-arm tool, according to one embodiment.

The EOAT 140 can be used to pick an item from a holding area 160 (e.g., a table, a container, a tote, a conveyor, etc.). The EOAT 140 can include a sock puppet, claw, (articulated) fingers, suction cups, or other types of end effectors for grasping and carrying an item. By way of example, FIG. 3 illustrates a sock puppet end effector 310, which can be used as the EOAT 140, according to one embodiment. The sock puppet end effector 310 may include one or more actuators (e.g., pistons) (not shown), which are configured to manipulate the material 320, such that the material forms and grips around one or more gripping points of a target item. The material 320 may include any type of material (e.g., foam, plastic, etc.) that is capable of being deformed (or manipulated) by actuating one or more pistons.

Figure 4:
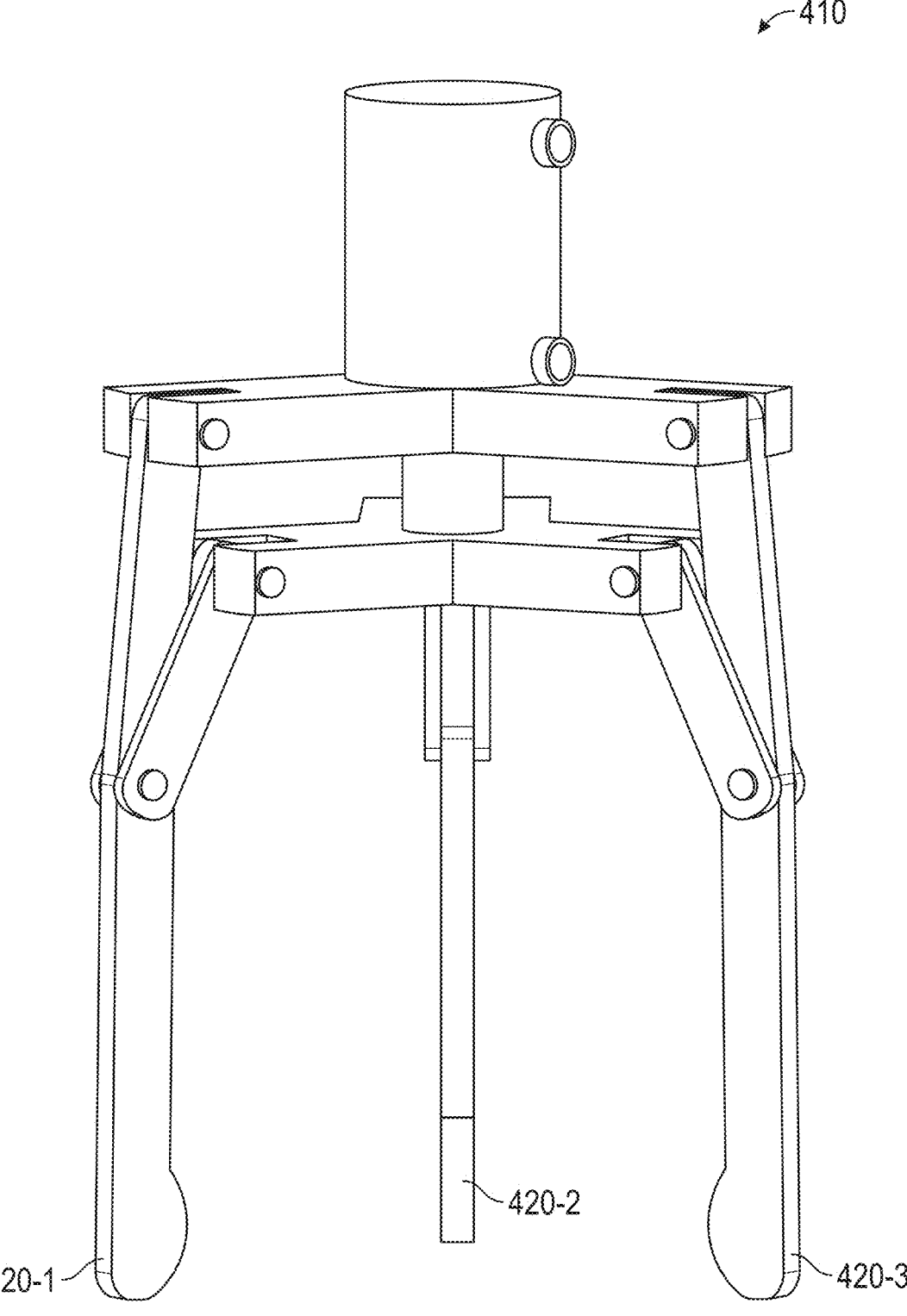
FIG. 4 illustrates another example end effector for an end-of-arm tool, according to one embodiment.
Figure 5:
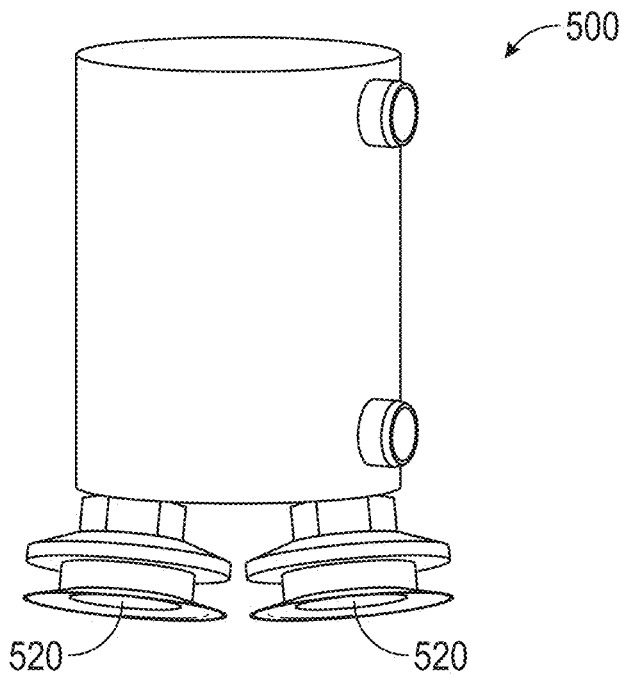
FIG. 5 illustrates another example end effector for an end-of-arm tool, according to one embodiment.

In another example, FIG. 4 illustrates an (articulated) finger end effector 410, which includes one or more articulated fingers 420 for grasping a target item, according to one embodiment. Note that while FIG. 4 illustrates the finger end effector 410 with three articulated fingers 420 1-3, the finger end effector 410 can include any number of articulated fingers. In yet another example, FIG. 5 illustrates a suction end effector 510, which includes one or more suction cups 520, which can be used to apply suction to a target item in order to grasp the target item, according to one embodiment.

Figure 6A:
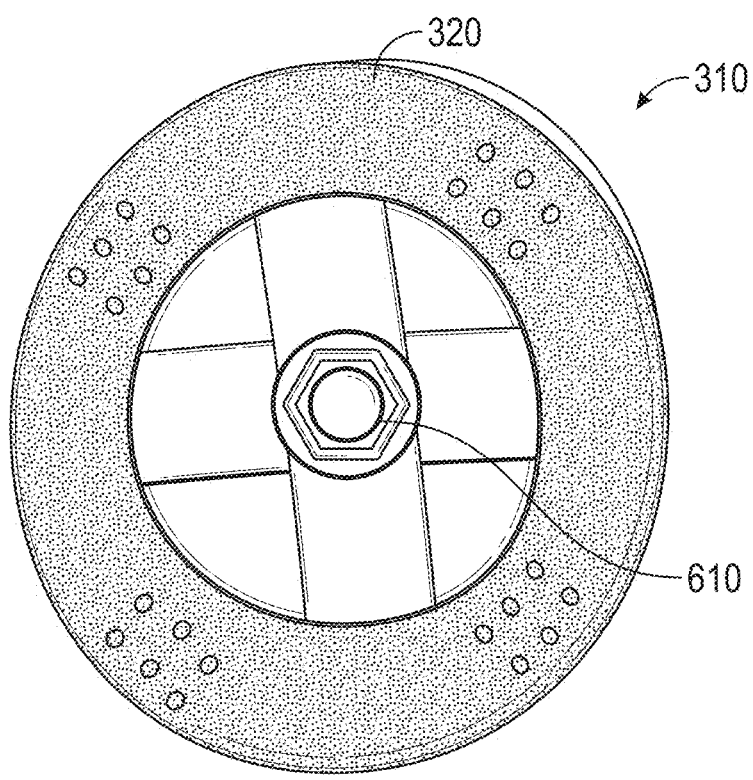
FIG. 6A illustrates an example grasp formed using a type of end effector for an end-of-arm tool, according to one embodiment.
Figure 6B:
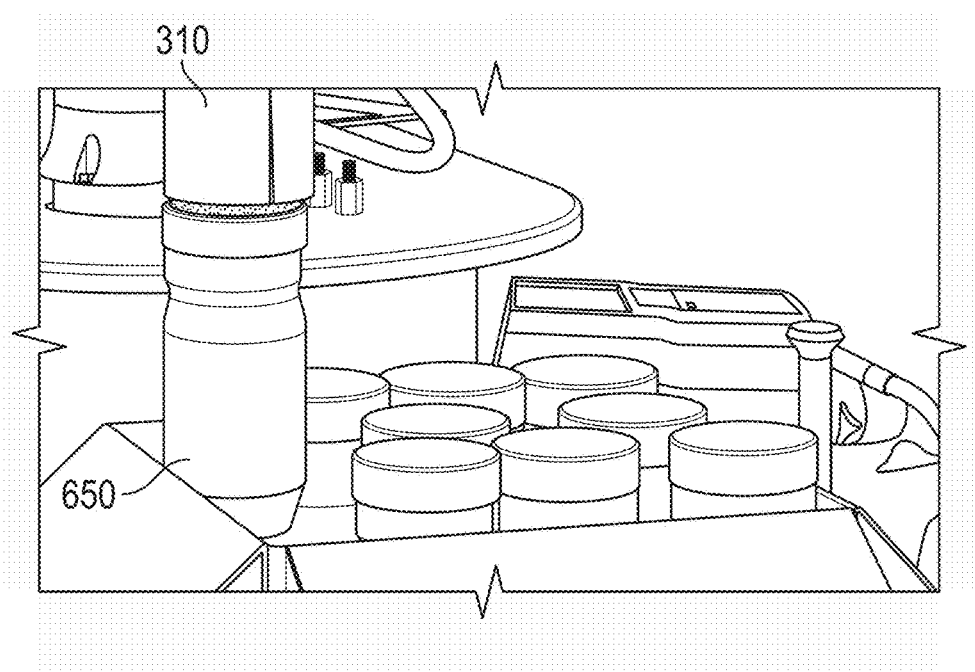
FIG. 6B illustrates an example of an end-of-arm tool grasping an item using the grasp illustrated in FIG. 6A, according to one embodiment.

In one embodiment, the EOAT 140 can include one type of end effector that is configured to form different types of grasps. As a reference example, the sock puppet end effector 310 can form different types of grasps, depending on the number of pistons that are actuated, in order to pick different types of items. FIG. 6A illustrates the sock puppet end effector 310 with a flat suction configuration, according to one embodiment. In this configuration, the sock puppet end effector 310 can attach vertically to a flat surface and apply suction via a vacuum tool 610 to grasp a target item. This configuration may be used for objects with large and flat suctionable surfaces (e.g., cardboard packaged goods, wrapped objects, etc.) and/or for heavy cluttered holding areas. As shown in FIG. 6B, for example, the sock puppet end effector 310 can use this flat suction configuration to grasp a jar object 650. The robotic arm 102 may refrain from actuating any pistons of the EOAT 140 in order to use the flat suction configuration.

Figure 6C:
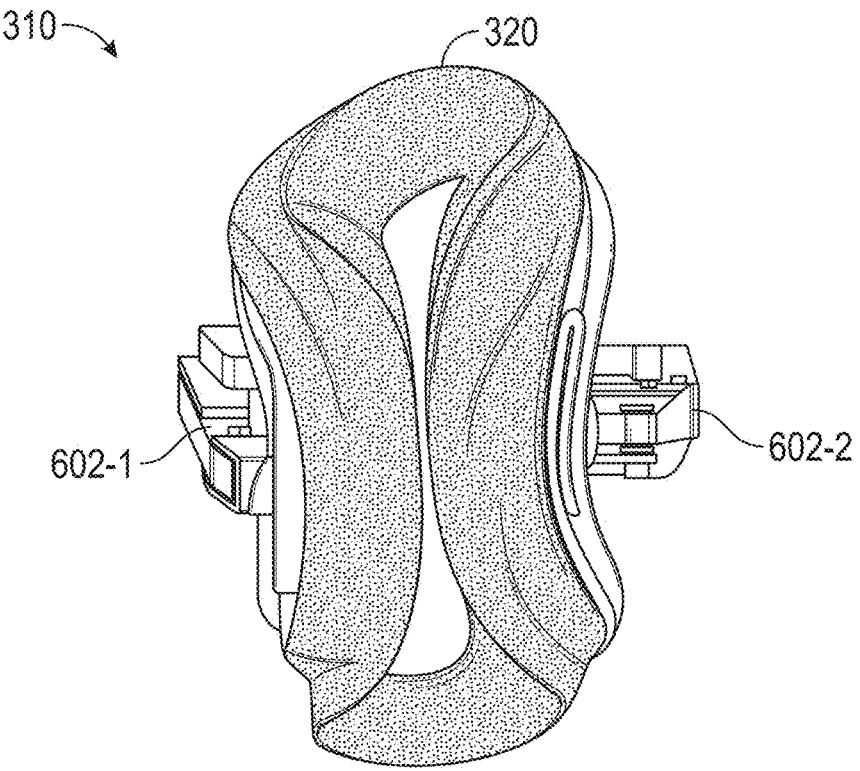
FIG. 6C illustrates another example grasp formed using a type of end effector for an end-of-arm tool, according to one embodiment.
Figure 6D:
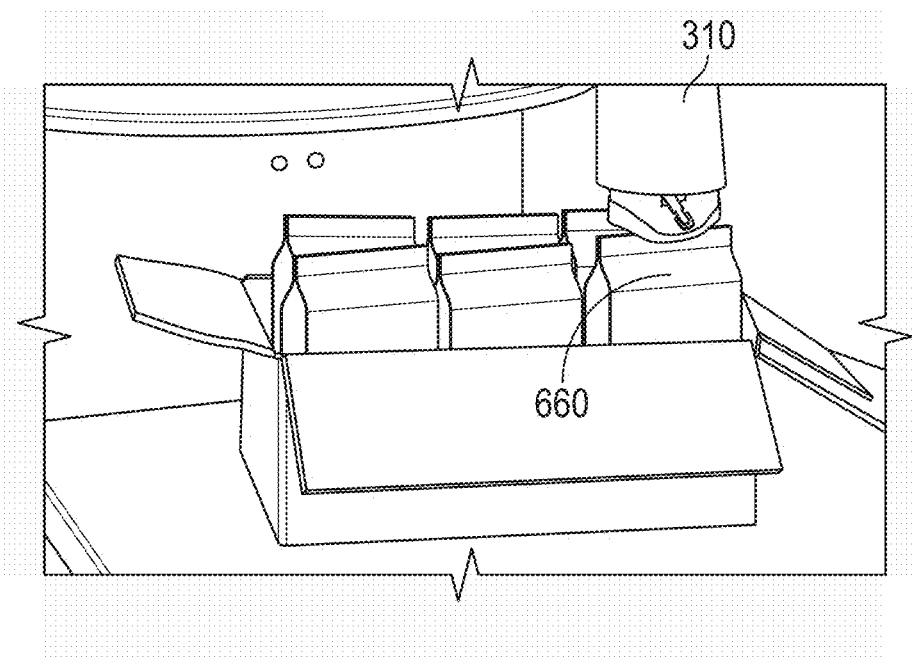
FIG. 6D illustrates an example of an end-of-arm tool grasping an item using the grasp illustrated in FIG. 6C, according to one embodiment.

FIG. 6C illustrates the sock puppet end effector 310 with a parallel grasping configuration, according to one embodiment. In this configuration, the sock puppet end effector 310 can grasp objects using a (two-finger) pinch grasp, formed by actuating a pair of pistons 602 1-2. This configuration may be used to pick up objects with smaller, irregular surfaces (e.g., vegetables), objects made of semi-porous materials (e.g., items packaged in mesh bags), etc. This configuration may be combined with or without suction (e.g., via vacuum tool 610). As shown in FIG. 6D, the sock puppet end effector 310 can use this pinch grasp to grasp a snack bag 660.

Figure 6E:
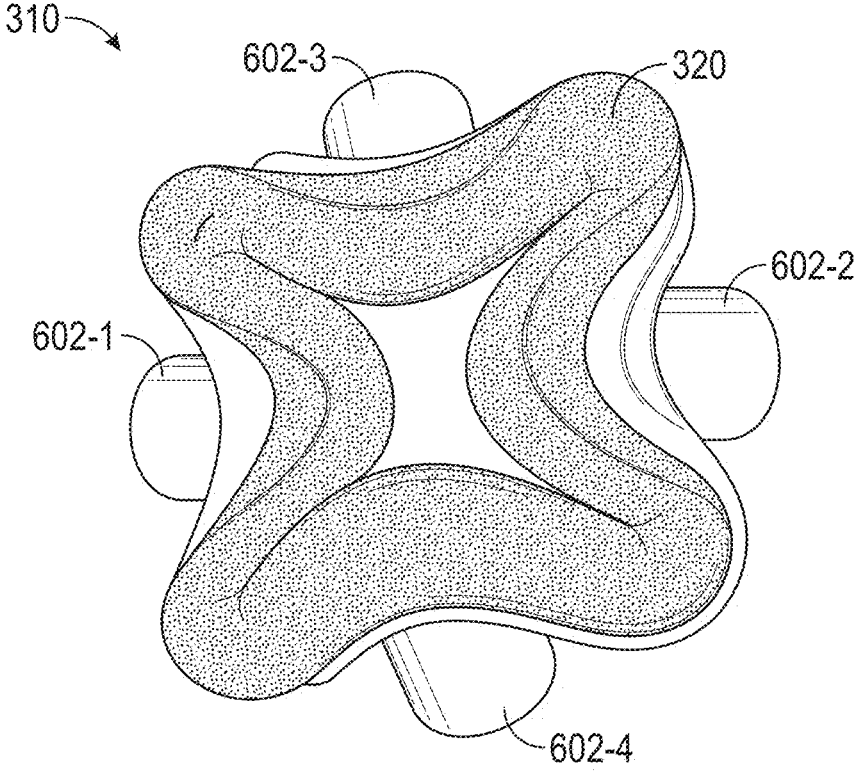
FIG. 6E illustrates another example grasp formed using a type of end effector for an end-of-arm tool, according to one embodiment.
Figure 6F:
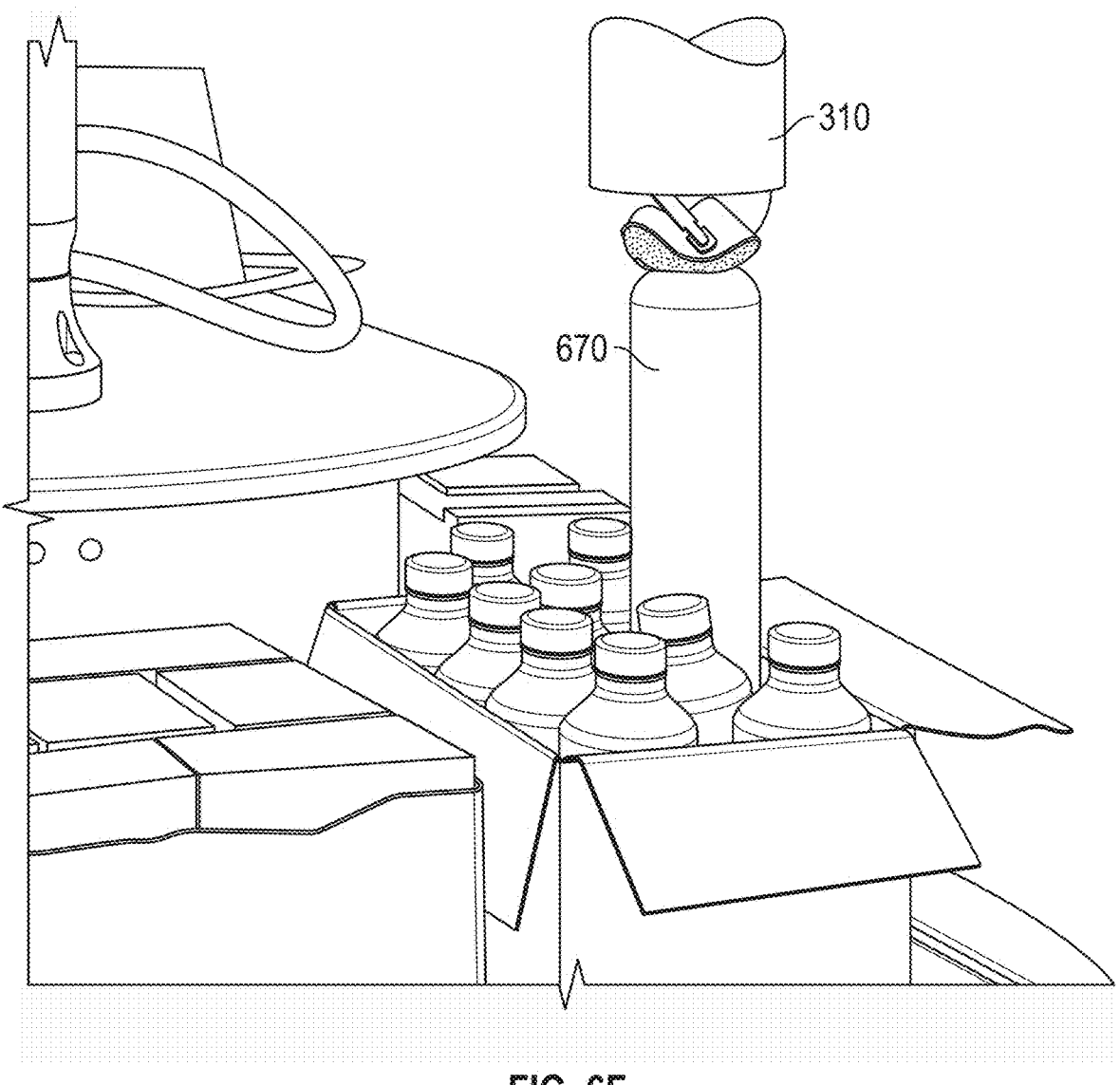
FIG. 6F illustrates an example of an end-of-arm tool grasping an item using the grasp illustrated in FIG. 6E, according to one embodiment.

FIG. 6E illustrates the sock puppet end effector 310 with a cup configuration, according to one embodiment. In this configuration, the sock puppet end effector 310 can grasp objects by actuating four pistons 602 1-4. In some embodiments, the sock puppet end effector 310 can partially actuate the four pistons 602 1-4, forming a "small" cup grasp. This configuration may be used to pick items with small accessible areas (e.g., a cap of a bottle). This configuration may be combined with or without suction (e.g., via vacuum tool 610). As shown in FIG. 6F, the sock puppet end effector 310 can use this "small" cup grasp to grasp a plastic bottle 670.

Referring back to FIG. 2, the controller 210 includes the segmentation component 152 and the grasp component 154, which are configured to perform one or more techniques described herein. Although not shown, the controller 210 may include a processor(s), a memory, and/or a storage. The processor(s), for example, may represent any number of processing elements which can include any number of processing cores. In one embodiment, the processor(s) can include one or more central processing units (CPUs). The memory can include volatile memory, non-volatile memory, and combinations thereof. The storage may be a combination of fixed and/or removable storage devices, such as fixed disc drives, removable memory cards, optical storage, network attached storage (NAS), or a storage area-network (SAN). In one embodiment, the computing elements (or components) of the controller 210 may be located within the controller 210 or elsewhere (e.g., in the cloud).

In one embodiment, the segmentation component 152 and/or the grasp component 154 may be located within memory of the controller 210. As described below, the segmentation component 152 can perform instance segmentation to segment an individual target item out of a cluster of items of the same ID or different IDs, based on a reference image of the target item and attributes of the target item. The grasp component 154 can generate a grasp plan (e.g., type of grasp, grasp points on the target item, amount of grasp force to use, etc.) based on the item attributes and segmentation output from the segmentation component 152.

In one embodiment, the controller 210 can be used to control movement of the robotic arm 102 and/or EOAT 140. In one example, the controller 210 can receive instructions from another computing system (e.g., management system 110) for controlling the robotic arm 102 and/or EOAT 140. In another example, the controller 210 can control movement of the robotic arm 102 and/or EOAT 140, based on information obtained via the perception sensor(s) 204, segmentation component 152, and/or grasp component 154. Although depicted as a part of the robotic arm 102, in some embodiments, the controller 210 can be separate from the robotic arm 102.

In addition to the components of the robotic arm 102, the automated order fulfillment system 100 can include an ancillary tool 220 that supports the operations performed by the robotic arm 102. For example, one or more of the perception sensors 204 or the tools on the mount 202 may instead be attached to the ancillary tool 220. In one embodiment, the ancillary tool 220 may be a conveyor belt that moves items to or from the robotic arm 102.

Figure 7:
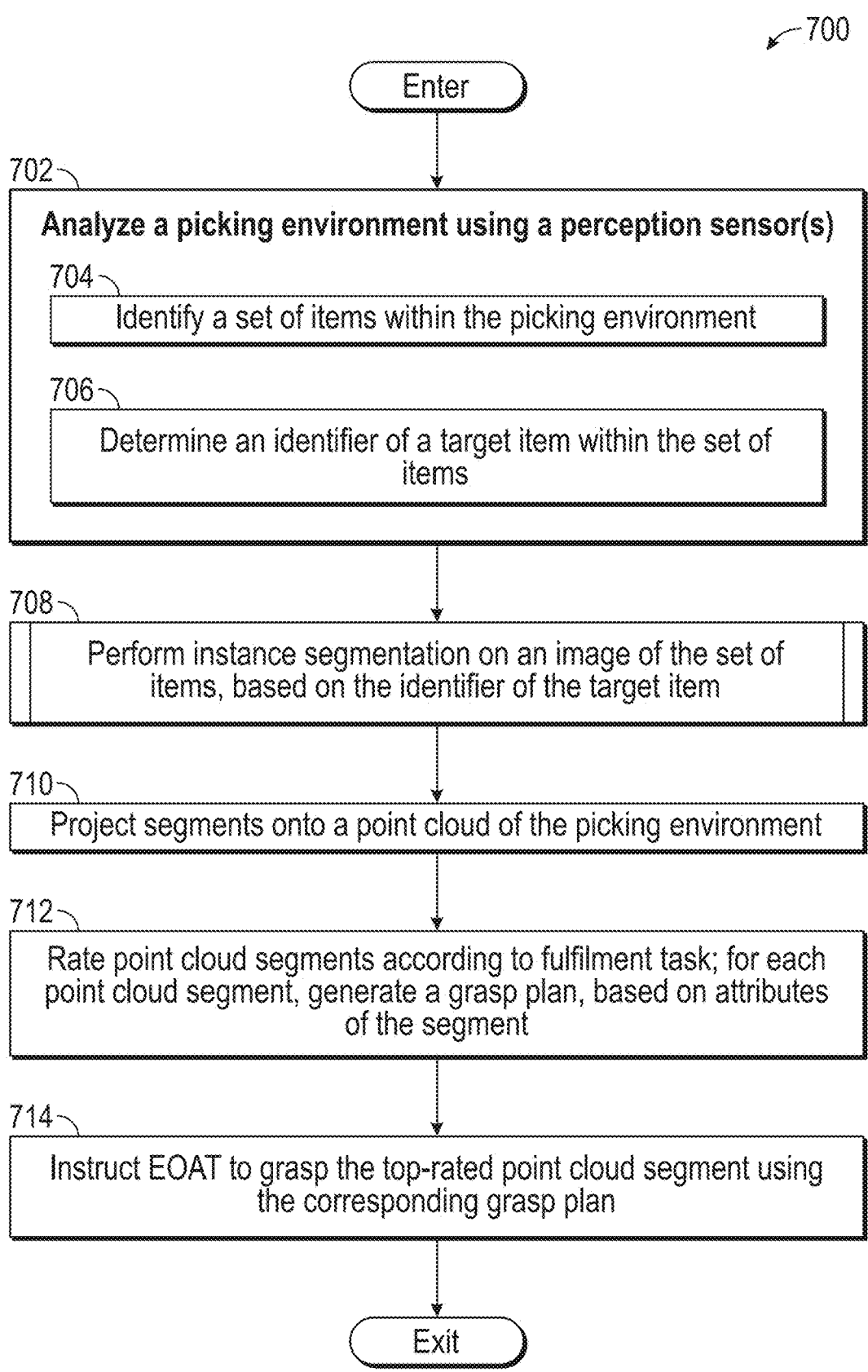
FIG. 7 is a flowchart of a method for performing a robotic picking operation, according to one embodiment.

FIG. 7 is a flowchart of a method 700 for performing a robotic picking operation, according to one embodiment. The method 700 may be performed by one or more components of the automated order fulfillment system 100. In one particular embodiment, the method 700 is performed by a computing system (also referred to as a controller) (e.g., controller 210, management system 110, etc.).

Method 700 may enter at block 702, where the computing system analyzes a picking environment using one or more perception sensors (e.g., perception sensors 204). The computing system may rely on a plurality of perception systems that may be the same type (e.g., multiple cameras) or different types (e.g., a camera and a depth sensor). The picking environment may include a holding area (e.g., holding area 160) within a picking station (e.g., picking station 104).

In one embodiment, the sensor data captured by the perception sensor or sensors is analyzed by a computer processor and a software application (e.g., segmentation component 152). The software application may perform image processing to identify items of interest in a captured image and/or depth map. The automated order fulfillment system 100 can use this information to provide instructions and movement commands to the robotic arm (e.g., robotic arm 102) and EOAT (e.g., EOAT 140) described herein to perform a pick operation.

Block 702 includes sub-steps 704 and 706 that can be performed by the computing system. At block 704, the computing system identifies a set of items within the picking environment. For example, the computing system can capture an RGB image and a depth image of the picking environment.

At block 706, the computing system determines an identifier of a target item within the set of items. For example, in one embodiment, the image(s) of the picking environment may include multiple items (e.g., grocery items) of the same ID (e.g., the same type of items). In another embodiment, the image(s) of the picking environment may include multiple items of different IDs (e.g., different types of items). In yet another embodiment, the image(s) of the picking environment may include a combination of multiple items of the same ID and multiple items of different IDs. The computing system can apply image processing techniques to determine the ID of an individual target item from the set of items within the image.

At block 708, the computing system (e.g., using the segmentation component 152) performs instance segmentation on an image of the set of items, based on the target item ID. As described in further detail below with reference to FIG. 8, the computing system can obtain (or retrieve) an image of the target item and/or determine one or more attributes of the target item, based on the target item ID. At block 710, the computing system projects one or more of the segments (output from the instance segmentation) onto a point cloud of the picking environment.

At block 712, the computing system rates the point cloud segments according to the fulfillment task (e.g., type of picking operation, type of item, available EOAT, etc.). For each point cloud segment, the computing system generates a grasp plan, based on attribute(s) of the segment. The segment attributes can include, for example, a shape of the segment, a topography of the segment, etc. In some embodiments, the computing system may generate the grasp plan using one or more machine learning (ML) models/techniques.

For example, the robotic arm may handle a wide range of objects varying in size, shape, texture, weight, etc. In some cases, a combination of suction and rigid gripping can achieve good grasping coverage of the variety of different types of objects. For example, a rigid gripper can be used for picking irregular-shaped and porous materials, whereas suction can be used to handle flat, larger objects with a good suction seal. Additionally, rigid and vacuum combination grasps may be able to handle a wide range of delicate and irregular shaped objects without damaging them.

As such, embodiments can use the known item attributes (e.g., fragility, deformation, etc.) to guide the grasping mode selection (e.g., vacuum, pinch, vacuum and pinch) and amount of grasping force of the grasp plan, while the shape and topography of the item point cloud can guide the grippers to adapt to the object being handled to conform to the structure of the item.

At block 714, the computing system instructs the EOAT to grasp (or pick) the top-rated point cloud segment using the corresponding grasp plan for that segment. The method 700 may then exit.

FIG. 8 is a flowchart of a method 800 for performing instance segmentation, according to one embodiment. The method 800 may be performed by one or more components of the automated order fulfillment system 100. In one particular embodiment, the method 800 is performed by a computing system (also referred to as a controller) (e.g., controller 210, management system 110, etc.). In one embodiment, the method 800 may be implemented as part of block 708 of method 700 illustrated in FIG. 7.

Method 800 may enter at block 802, where the computing system obtains a reference image of the target item, based on the target item ID. The computing system may use the target item ID to retrieve the reference image (e.g., a 2D image) from a storage location (e.g., database) accessible to the computing system. The storage location may be an internal storage location or external storage location.

Optionally, at block 804, the computing system may determine one or more attributes of the target item, based on the target item ID. The attributes may include, but are not limited to, size of the target item, dimensions of the target item, weight of the target item, etc.

At block 806, the computing system evaluates the reference image, an image of the picking environment (e.g., input image), and the target item attributes (if available), using a segmentation network structure that includes a first neural network and a second neural network. Block 806 includes sub-steps 808, 810, 812, 814, 816, 818, and 820 that can be performed by the computing system.

At block 808, the computing system evaluates the reference image with the first neural network. In one embodiment, the first neural network is a (first) convolutional neural network (CNN). For example, the first CNN may be a residual network (ResNet) backbone of a Mask R-CNN. At block 810, the computing system determines a first set of features of the reference image, based on the evaluation of the reference image with the first neural network.

At block 812, the computing system evaluates the image of the picking environment with the second neural network. In one embodiment, the second neural network is a (second) CNN. For example, the second CNN may be another ResNet backbone of a Mask R-CNN. At block 814, the computing system determines a second set of features of the image of the picking environment, based on the evaluation of the picking environment image with the second neural network.

At block 816, the computing system compares a first subset of the first set of features (of the reference image) to a first subset of the second set of features (of the picking environment image). For example, the first subset of the first set of features (of the reference image) may include high level image features of the reference image (e.g., semantic image features of the reference image), and the first subset of the second set of features (of the picking environment image) may include high level image features of the picking environment image (e.g., semantic image features of the picking environment image). In this example, the operations in block 816 may include comparing the first subset of the first set of features of the reference image (e.g., high level image features of the reference image) to the first subset of the second set of features of the picking environment image (e.g., high level image features of the picking environment image) on a pixel-by-pixel basis. In one embodiment, the computing system may apply global average pooling to the high level features of the reference image prior to comparing these high level features to the high level features of the picking environment image.

At block 818, the computing system modifies the first subset of the second set of features (of the picking environment image), based on the comparison. For example, in one embodiment, the computing system may compute a pixel-wise L2 distance (e.g., a Euclidean norm) between the first subset of the first set of features and the first subset of the second set of features, and replace the first subset of the second set of features (of the picking environment image) with the pixel-wise L2 distances. The remaining subset(s) of the second set of features (of the picking environment image) (e.g., the semantic weak (or low-level) features) may remain the same.

At block 820, the computing system may optionally update at least one of a configuration or a segmentation mask, based on one or more of the target item attributes. For example, in some embodiments, the computing system may modify an inference configuration, such as anchor size and aspect ratio, based on the minimum and maximum value of size and aspect ratio for the target item. Additionally or alternatively, the computing system can filter out one or more generated mask proposals, so that oversized and undersized masks are removed.

At block 822, the computing system generates, based on the evaluation, an image of the picking environment including one or more class agnostic instance segments of the target item.

Figure 9:
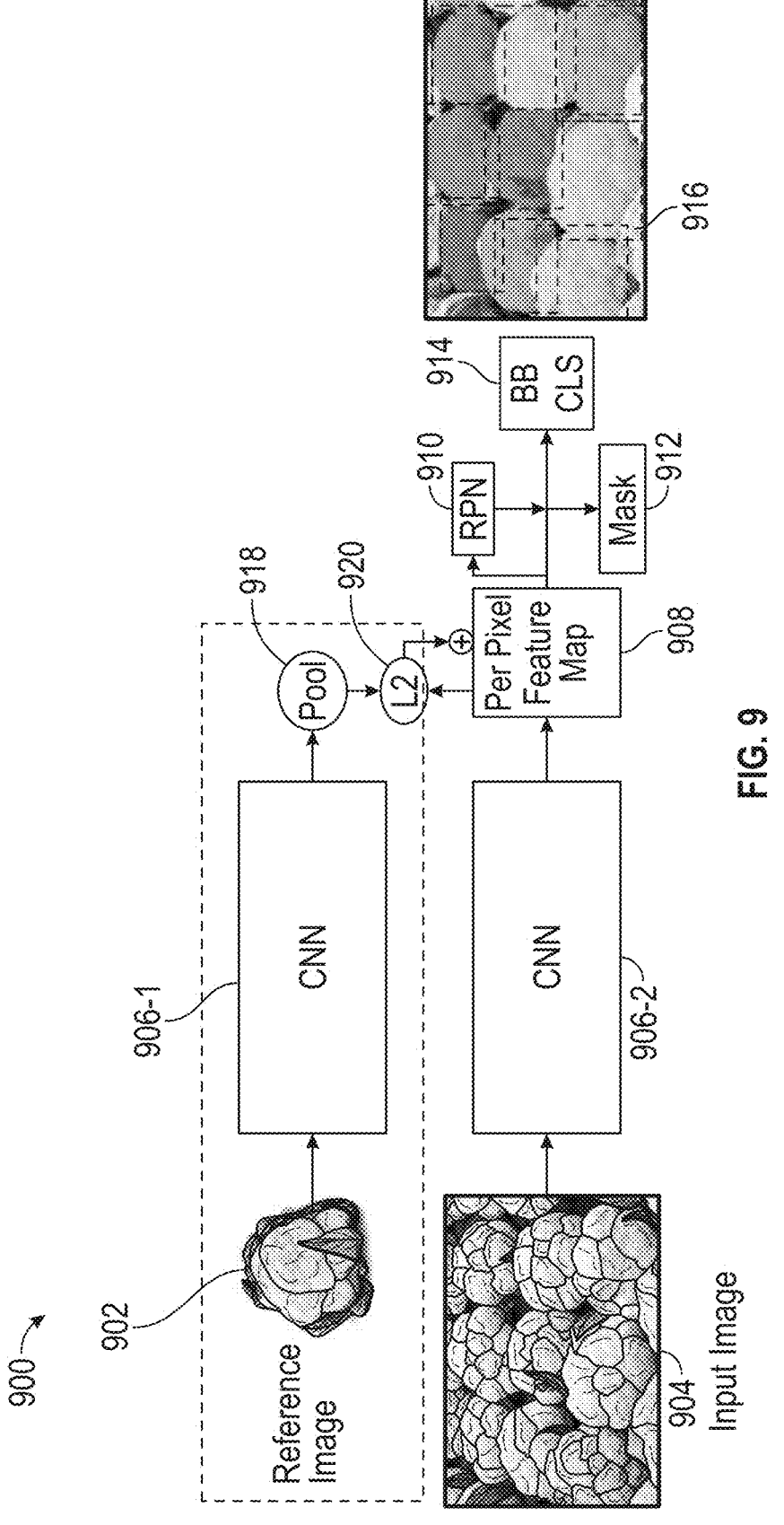
FIG. 9 is a block diagram of a workflow for performing instance segmentation, according to one embodiment.

FIG. 9 is a block diagram of a workflow 900 for performing instance segmentation on an image of a picking environment according to one embodiment. In one embodiment, the workflow 900 may be used to implement method 800 illustrated in FIG. 8. As shown, the workflow 900 accepts a reference image 902 into a first CNN 906-1 (e.g., ResNet 101) and accepts an input image 904 into a second CNN 906-2 (e.g., ResNet 101). The CNN 906-1 may determine image features of the reference image 902, and the CNN 906-2 may determine image features of the input image 904. Note that while FIG. 9 uses the input image 904 as an example image of a picking environment having multiple items of the same ID (e.g., multiple cauliflower), the workflow 900 (including the techniques described herein) are not limited to images of multiple items of the same ID. In some embodiments, the workflow 900 may use other input images depicting different picking environments. For example, in one embodiment, the workflow 900 may accept an input image depicting multiple items of different IDs. In another embodiment, the workflow 900 may accept an input image depicting a combination of multiple items of the same ID and multiple items of different IDs.

At 918, at least a subset of the image features (e.g., high level image features) of the reference image 902 are globally pooled. At 920, pixel-wise L2 distances are computed between the globally pooled image features of the reference image 902 and a subset of image features (e.g., high level image features) of the input image 904. As shown, the feature map 908, which includes the image features of the input image 904, is then updated by replacing the subset of the image features (e.g., high level image features) of the input image 904 with the computed pixel-wise L2 distances. The updated feature map 908 is then input into a region proposal network (RPN) 910 to generate a mask 912, bounding boxes (BBOX) and Class (collectively referred to as BB CLS 914). Using the mask 912 and BB CLS 914, the workflow 900 can output an image 916 showing bounding boxes around each instance of a semantic class (e.g., cauliflower).

Figure 10:
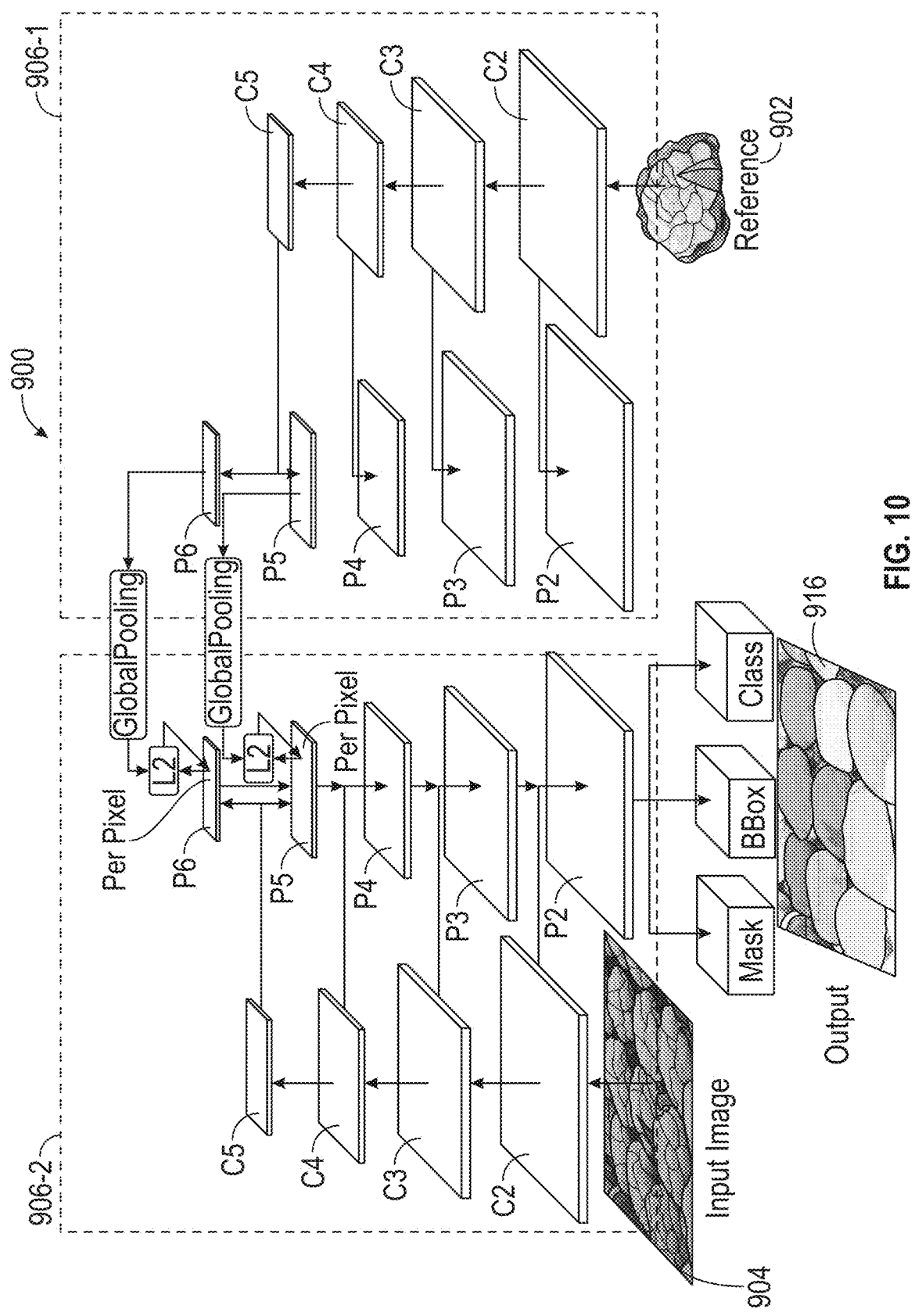
FIG. 10 further illustrates components of the block diagram of the workflow illustrated in FIG. 9, according to one embodiment.

In some embodiments, the CNNs 906 1-2 may be implemented using a segmentation network structure that modifies Mask R-CNN with a Siamese ResNet feature backbone. FIG. 10 illustrates a particular example in which each CNN 906 1-2 implements multiple convolutional layers (C2-C5), according to one embodiment. As shown in FIG. 10, the segmentation network structure joins two mirrored ResNets (e.g., ResNet 101) backbones with a Feature Pyramid Network (FPN) that encodes the input image 904 and the reference image 902 into two multi-resolution frame embedding. In this particular embodiment, five levels of image features P2 to P6 is generated with the FPN for both inputs (e.g., input image 904 and reference image 902), where P5 and P6 are high level, semantic-rich features and P2-P4 are lower-level features (e.g., edges, corners, etc.). Note that as used herein, the image features from the input image 904 may be denoted as P(q) and the image features form the reference image 902 may be denoted as P(r).

As shown in FIG. 10, global average pooling is applied to P5(r) and P6(r). The pixel-wise L2 distance is then computed to the corresponding global pool vectors for P5(q) and P6(q), and the original pixels in P5(q) and P6(q) are replaced with the pixel-wise L2 distance. P6(q) to P2(q) are interconnected and connected to the rest of the Mask R-CNN heads. On the other hand, the low-level features P2(r) to P4(r) from the reference image 902 are discarded. The classification heads are then modified to binary classification.

Figure 11A:
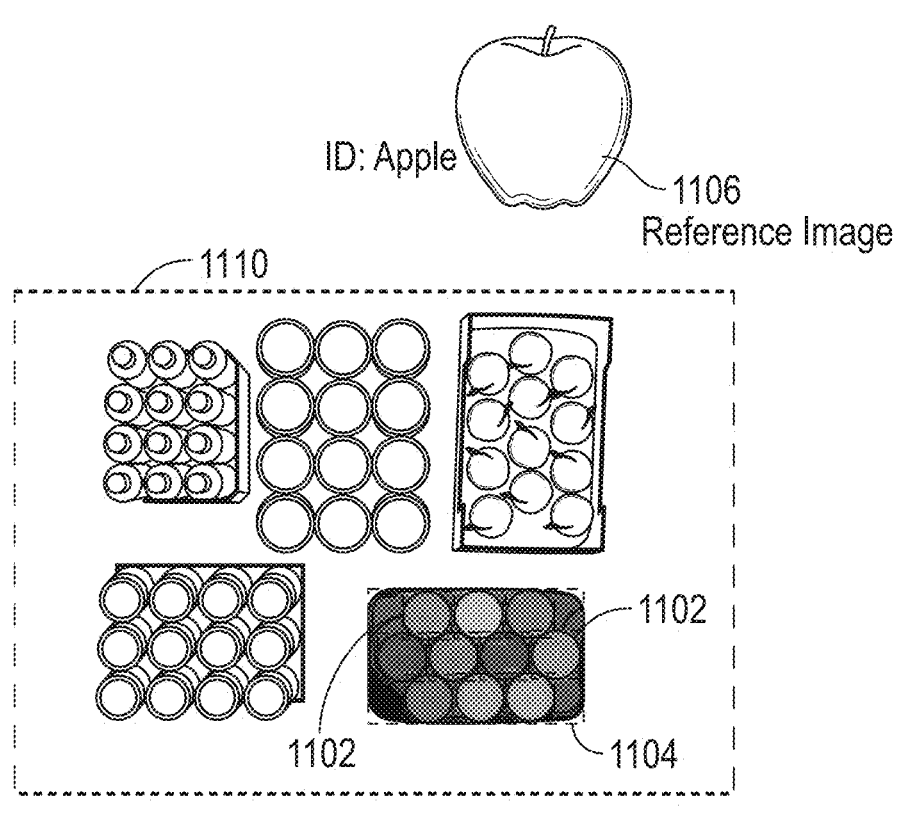
FIG. 11A illustrates an example output of instance segmentation performed on an image of a picking environment, according to one embodiment.
Figure 11B:
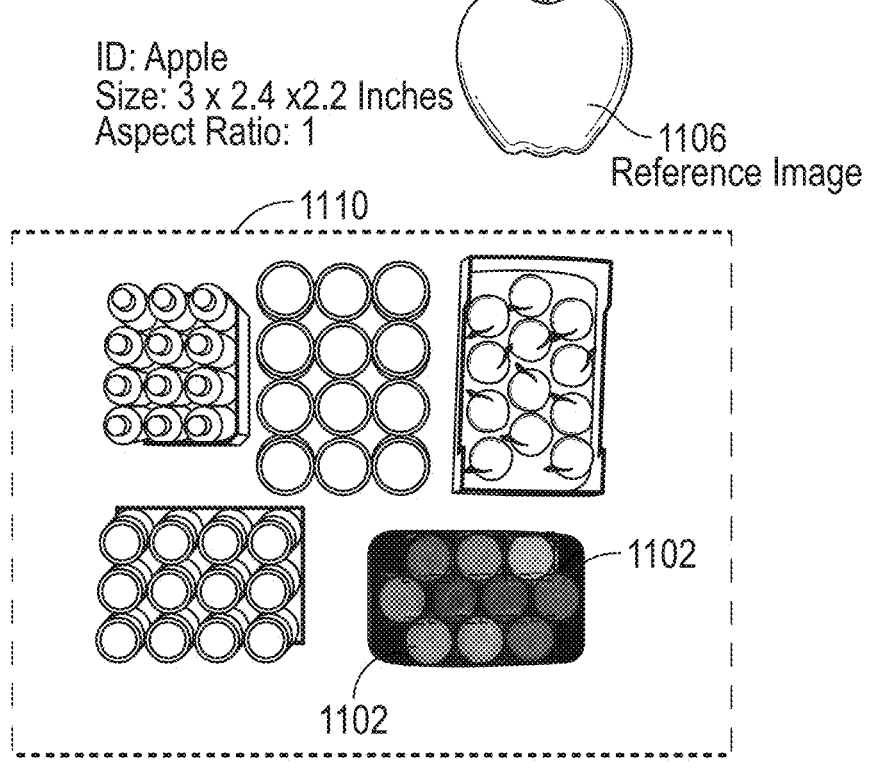
FIG. 11B illustrates another example output of instance segmentation performed on an image of a picking environment, according to one embodiment.

As noted above, in some embodiments, the instance segmentation techniques described herein can use attributes of the target item to further improve segmentation accuracy. As shown in FIG. 11A, for example, given the ID of a target item (e.g., "apple") and a reference image 1106 of the target item, the computing system can identify ten instances of the target item (e.g., ten "apples") within the picking environment image 1110, which includes a combination of multiple items of different IDs and multiple items of the same ID. However, as shown in FIG. 11A, in some instances, the computing system may incorrectly identify the set of items 1104 (e.g., the group of apples) as an instance of the target item. As shown in FIG. 11B, when the size and aspect ratio information is supplemented with the ID of the target item and the reference image 1106 of the target item, the computing system can identify the ten instances of the target item within the picking environment image 1110, without identifying the set of items 1104 as an instance of the target item.

Figure 12:
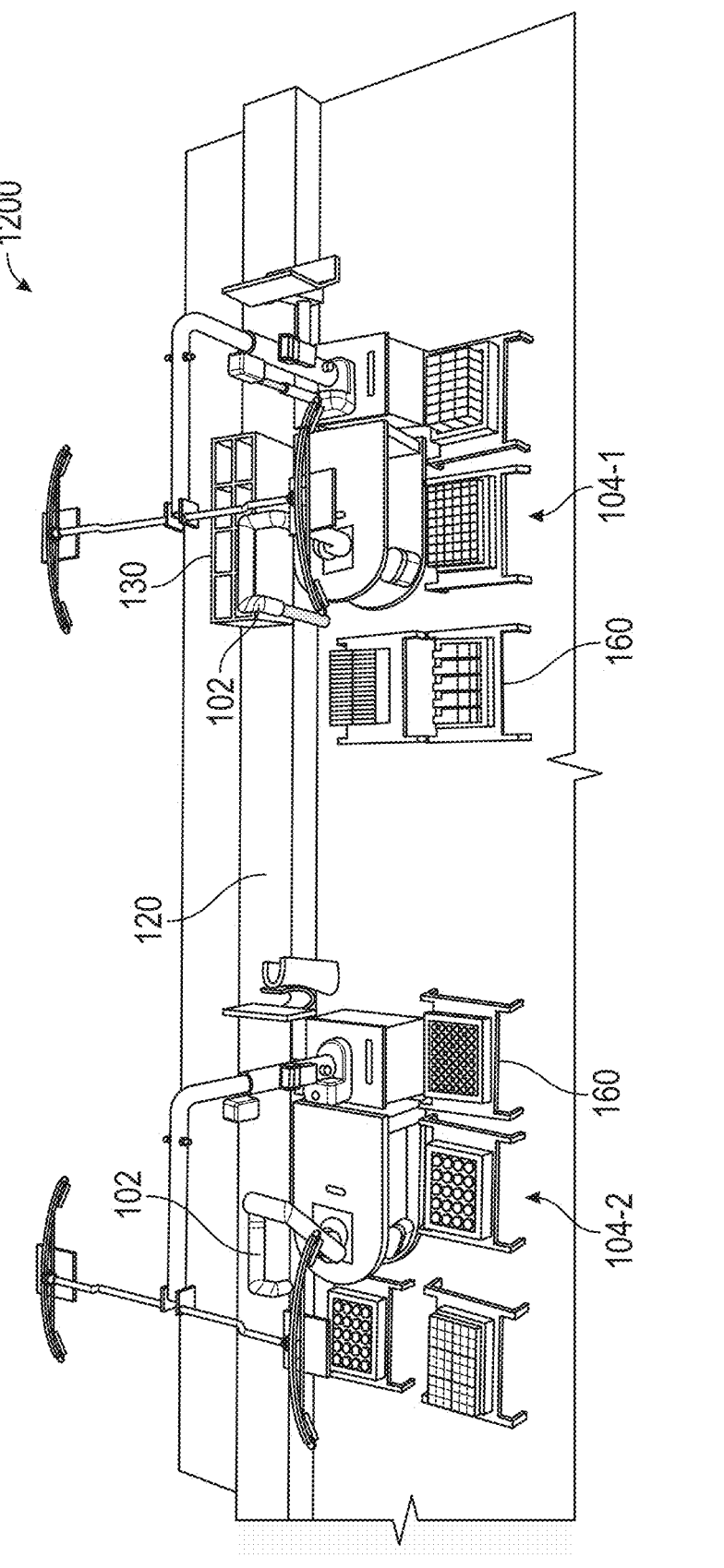
FIG. 12 illustrates an automated grocery fulfillment system, according to one embodiment.

FIG. 12 illustrates an example automated grocery fulfillment system 1200, according to one embodiment. The automated grocery fulfillment system 1200 is one example implementation of the automated order fulfillment system 100 illustrated in FIG. 1. As shown, the automated grocery fulfillment system 1200 includes picking stations 104-1 and 104-2, each including one or more holding areas 160 containing different sets of grocery items. Each picking station 104 includes a robotic arm 102 that is configured to pick an item from a holding area 160 and place the item into one of the packages 130 on the holding area 120.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:

obtaining an image of a picking environment comprising a plurality of items;

obtaining a reference image of a first item of the plurality of items, based on an item ID associated with the first item; and performing an instance segmentation operation on the image of the picking environment to determine an instance of the first item among the plurality of items within the image of the picking environment, based on the reference image and the image of the picking environment, wherein performing the instance segmentation operation comprises:

evaluating the reference image with a first neural network to determine a first set of image features of the reference image;

evaluating the image of the picking environment with a second neural network to determine a second set of image features of the image of the picking environment;

comparing a first subset of the first set of image features of the reference image to a first subset of the second set of image features of the image of the picking environment;

modifying the first subset of the second set of image features of the image of the picking environment, based on the comparison;

retaining a second subset of the second set of image features of the image of the picking environment after modifying the first subset of the second set of image features of the image of the picking environment, wherein the second subset of the second set of image features comprises non-semantic image features of the image of the picking environment; and generating segmentation information for the image of the picking environment, based at least in part on the second set of image features, including the modified first subset of the second set of image features, wherein the segmentation information comprises an indication of at least the instance of the first item of the plurality of items within the image of the picking environment.

2. The computer-implemented method of claim 1, wherein:

the first subset of the first set of image features of the reference image comprises semantic image features of the reference image; and the first subset of the second set of image features of the image of the picking environment comprises semantic image features of the image of the picking environment.

3. The computer-implemented method of claim 2, wherein comparing the first subset of the first set of image features to the first subset of the second set of image features comprises determining a pixel-wise Euclidean norm between the semantic image features of the reference image and the semantic image features of the image of the picking environment.

4. The computer-implemented method of claim 2, further comprising applying a global average pooling to the semantic image features of the reference image to generate a globally pooled set of semantic image features, wherein comparing the first subset of the first set of image features to the first subset of the second set of image features comprises determining a pixel-wise Euclidean norm between the globally pooled set of semantic image features and the semantic image features of the image of the picking environment.

5. The computer-implemented method of claim 4, wherein modifying the first subset of the second set of image features of the image of the picking environment comprises replacing the semantic image features of the image of the picking environment with the pixel-wise Euclidean norm between the globally pooled set of semantic image features and the semantic image features of the image of the picking environment.

6. The computer-implemented method of claim 1, wherein performing the instance segmentation operation further comprises discarding a second subset of the first set of image features of the reference image.

7. The computer-implemented method of claim 6, wherein the second subset of the first set of image features comprises non-semantic image features of the reference image.

8. The computer-implemented method of claim 1, further comprising determining one or more attributes of the first item, based on the item ID.

9. The computer-implemented method of claim 8, wherein performing the instance segmentation operation further comprises updating the segmentation information based on at least one of the one or more attributes of the first item.

10. The computer-implemented method of claim 8, wherein the one or more attributes comprise at least one of a size of the first item, dimensions of the first item, or an aspect ratio of the reference image of the first item.

11. The computer-implemented method of claim 1, wherein:

the first neural network comprises a first convolutional neural network;

the second neural network comprises a second convolutional neural network; and the second convolutional neural network is a mirrored version of the first convolutional neural network.

12. The computer-implemented method of claim 11, wherein the first convolutional neural network and the second convolutional neural network are joined using a feature pyramid network comprising a plurality of layers.

13. A non-transitory computer readable storage medium having computer-executable code stored thereon, the computer-executable code being executable by one or more computer processors to perform an operation comprising:

obtaining an image of a picking environment comprising a plurality of items;

obtaining a reference image of a first item of the plurality of items, based on an item ID associated with the first item; and performing an instance segmentation operation on the image of the picking environment to determine an instance of the first item among the plurality of items within the image of the picking environment, based on the reference image and the image of the picking environment, wherein performing the instance segmentation operation comprises:

evaluating the reference image with a first neural network to determine a first set of image features of the reference image;

evaluating the image of the picking environment with a second neural network to determine a second set of image features of the image of the picking environment;

comparing a first subset of the first set of image features of the reference image to a first subset of the second set of image features of the image of the picking environment;

modifying the first subset of the second set of image features of the image of the picking environment, based on the comparison;

retaining a second subset of the second set of image features of the image of the picking environment after modifying the first subset of the second set of image features of the image of the picking environment, wherein the second subset of the second set of image features comprises non-semantic image features of the image of the picking environment; and generating segmentation information for the image of the picking environment, based at least in part on the second set of image features, including the modified first subset of the second set of image features, wherein the segmentation information comprises an indication of at least the instance of the first item of the plurality of items within the image of the picking environment.

14. The non-transitory computer readable storage medium of claim 13, wherein:

the first subset of the first set of image features of the reference image comprises semantic image features of the reference image; and the first subset of the second set of image features of the image of the picking environment comprises semantic image features of the image of the picking environment.

* * * * *